United States Patent
Kopper et al.

(10) Patent No.: US 11,394,273 B2
(45) Date of Patent: Jul. 19, 2022

(54) ELECTRIC MOTOR HAVING IMPELLERS FOR COOLING

(71) Applicant: ebm-papst Landshut GmbH, Landshut (DE)

(72) Inventors: Jan Kopper, Landshut (DE); Sven Kneip, Marzling (DE)

(73) Assignee: EBM-PAPST LANDSHUT GMBH, Landshut (DE)

( * ) Notice: Subject to any disclaimer, the term of this patent is extended or adjusted under 35 U.S.C. 154(b) by 0 days.

(21) Appl. No.: 16/475,591

(22) PCT Filed: Aug. 24, 2018

(86) PCT No.: PCT/EP2018/072931
§ 371 (c)(1),
(2) Date: Jul. 2, 2019

(87) PCT Pub. No.: WO2019/063219
PCT Pub. Date: Apr. 4, 2019

(65) Prior Publication Data
US 2020/0036262 A1    Jan. 30, 2020

(30) Foreign Application Priority Data

Sep. 27, 2017  (DE) .................... 10 2017 122 494.7

(51) Int. Cl.
*H02K 9/00* (2006.01)
*H02K 9/06* (2006.01)
(Continued)

(52) U.S. Cl.
CPC ............. *H02K 9/06* (2013.01); *H02K 1/2706* (2013.01); *H02K 9/19* (2013.01)

(58) Field of Classification Search
CPC .. H02K 9/02; H02K 9/04; H02K 9/06; H02K 9/19; H02K 1/2706; H02K 7/14; H02K 2213/03
(Continued)

(56) References Cited

U.S. PATENT DOCUMENTS 3,643,119 A * 2/1972 Lukens .................... H02K 9/06
                                                              310/60 R
3,749,953 A * 7/1973 Baumann ................ H02K 9/06
                                                              310/62
(Continued)

FOREIGN PATENT DOCUMENTS

DE   102007034013       1/2009
DE   202008015895 U1    2/2009
(Continued)

OTHER PUBLICATIONS

International Search Report dated Nov. 23, 2018.
German Search Report dated Sep. 27, 2017.

*Primary Examiner* — Maged M Almawri
(74) *Attorney, Agent, or Firm* — Dickinson Wright PLLC

(57) ABSTRACT

The disclosure relates to an electric motor, in particular configured as an internal rotor motor, for driving a fan having a stator, a rotor, a drive shaft, motor electronics disposed on a first axial side of the stator, a first cooling impeller which is associated with the motor electronics and disposed on the first axial side of the stator on the drive shaft and generates a first cooling air flow at least to the motor electronics during operation of the electric motor, and a second cooling impeller which is disposed immediately adjacent the stator on a second axial side of the stator opposite the first axial side and has impeller blades that generate a second cooling air flow at least in the axial direction along the stator during operation of the electric motor.

12 Claims, 2 Drawing Sheets

(51) Int. Cl.
*H02K 1/2706* (2022.01)
*H02K 9/19* (2006.01)

(58) Field of Classification Search
USPC .................................................. 310/54–64
See application file for complete search history.

(56) References Cited

U.S. PATENT DOCUMENTS

| | | | | |
|---|---|---|---|---|
| 4,492,885 A * | 1/1985 | Kitamura | ................ | H02K 9/06 |
| | | | | 310/63 |
| 4,689,507 A * | 8/1987 | Baker | ...................... | H02K 9/06 |
| | | | | 310/58 |
| 4,757,221 A * | 7/1988 | Kurihashi | ................ | H02K 9/06 |
| | | | | 310/43 |
| 4,904,891 A * | 2/1990 | Baker | .................. | F04D 29/281 |
| | | | | 310/63 |
| 5,561,334 A * | 10/1996 | Ishida | ...................... | H02K 9/06 |
| | | | | 310/263 |
| 5,793,131 A | 8/1998 | Fisher et al. | | |
| 5,925,947 A * | 7/1999 | Kajiwara | ................ | H02K 9/18 |
| | | | | 310/58 |
| 6,411,000 B1 * | 6/2002 | Rew | ...................... | F04D 29/325 |
| | | | | 415/199.1 |
| 6,700,235 B1 * | 3/2004 | McAfee | ................ | H02K 9/06 |
| | | | | 310/58 |
| 6,700,239 B2 * | 3/2004 | Asao | ...................... | H02K 9/06 |
| | | | | 310/58 |
| 6,977,475 B2 * | 12/2005 | Kuribayashi | ............ | H02K 9/06 |
| | | | | 318/158 |
| 7,423,342 B2 * | 9/2008 | Hino | ...................... | G09B 23/18 |
| | | | | 257/706 |
| 8,288,913 B1 * | 10/2012 | Bourquin | ............ | H02K 17/165 |
| | | | | 310/216.018 |
| 2004/0108775 A1 * | 6/2004 | Bilsing | .................... | H02K 9/06 |
| | | | | 310/263 |
| 2005/0168080 A1 * | 8/2005 | Simofi-Ilyes | ............ | H02K 5/20 |
| | | | | 310/58 |
| 2008/0304986 A1 * | 12/2008 | Kenyon | ................ | F04D 29/083 |
| | | | | 417/423.12 |
| 2010/0176603 A1 * | 7/2010 | Bushnell | .................. | H02K 9/06 |
| | | | | 310/63 |
| 2010/0301692 A1 * | 12/2010 | Shirakata | ................ | H02K 5/225 |
| | | | | 310/89 |
| 2011/0100253 A1 | 5/2011 | Koyama et al. | | |
| 2012/0302147 A1 * | 11/2012 | Trautner | ................ | B24B 41/007 |
| | | | | 451/488 |
| 2013/0320786 A1 | 12/2013 | Isoda et al. | | |
| 2017/0207681 A1 * | 7/2017 | Lass | ........................ | H02K 5/20 |
| 2017/0257013 A1 * | 9/2017 | Weisheit | ............ | H02K 17/165 |
| 2018/0249873 A1 * | 9/2018 | Yoshida | .................. | F04D 17/12 |
| 2019/0097489 A1 * | 3/2019 | Ramy | .................. | H02K 5/1732 |
| 2020/0106327 A1 * | 4/2020 | Iglesias | .................... | H02K 9/06 |

FOREIGN PATENT DOCUMENTS

| | | |
|---|---|---|
| DE | 102013224430 A1 | 5/2015 |
| EP | 2446147 A1 | 6/2012 |
| FR | 2908941 A1 | 5/2008 |
| JP | H1189181 A | 3/1999 |
| JP | 2017055660 A | 3/2017 |
| WO | WO 2004/013944 A1 | 2/2004 |
| WO | WO 2016/142190 A1 | 9/2016 |

* cited by examiner

ELECTRIC MOTOR HAVING IMPELLERS FOR COOLING

RELATED APPLICATIONS

This application claims priority to PCT Application No. PCT/EP2018/072931, filed Aug. 24, 2018, and German Application No. DE 10 2017 122 494.7, filed Sep. 27, 2017, the entire contents of which are incorporated herein by reference in their entirety.

FIELD

The disclosure relates to an electric motor, in particular configured as an internal rotor motor, with improved motor cooling. The electrical motor is primarily used to drive a fan.

BACKGROUND

A plurality of electric motors for driving fans or ventilators is known in the prior art. Due to the usually very compact design of internal rotor motors, sufficient cooling must always be provided to ensure the desired performance and a long service life at the same time. We have discovered that it is often the winding temperature at the stator which is the parameter limiting maximum power. Thus, by reducing the winding temperature, the maximum power of the electric motor can be increased while maintaining the same speed.

BRIEF SUMMARY

Therefore, the present disclosure provides an electric motor the stator or windings on the stator of which are cooled during operation of the electric motor in order to increase the maximum power of the electric motor while maintaining a constant speed.

This object is achieved by the combination of features according to claim 1.

According to the disclosure, an electric motor, in particular an internal rotor motor, for driving a fan having a stator, a rotor, a drive shaft, motor electronics disposed on a first axial side of the stator and a first cooling impeller is proposed. The first cooling impeller is associated with the motor electronics and disposed on the first axial side of the stator on the drive shaft and generates a first cooling air flow at least to the motor electronics during operation of the electric motor. The electric motor further comprises a second cooling impeller disposed immediately adjacent the stator on a second axial side of the stator opposite the first axial side. The second cooling impeller has impeller blades generating a second cooling air flow at least in the axial direction along the stator during operation of the electric motor.

The use of two cooling impellers axially opposite to the stator and rotor enables active cooling of both the motor electronics and the rotor and stator having laminated cores and windings. The radial first cooling air flow generated by the first cooling impeller flows in particular along the motor electronics disposed on a printed circuit board and along the axial outer surface of the rotor and stator adjacent to the printed circuit board. The axial second cooling air flow generated by the second cooling impeller preferably travels along the inner circumferential surface of the stator and is blown off radially on the outside of the stator windings.

Advantageously, a cooling gap is formed between the stator and the rotor through which the second cooling impeller draws the second cooling air flow. To that end, the second cooling impeller is configured as a radial impeller.

Thus, the cooling air flow can have a double cooling effect on components of the stator, i.e., on the inside and outside when it is drawn in and blown out. Reducing the stator temperature or the winding temperature at the stator by providing two axially opposite cooling impellers allows to achieve a higher maximum power while maintaining the same speed and thus an increased power output. Motors of larger dimensions may be replaced by an electric motor of the present disclosure. Furthermore, the effective cooling increases the service life of the motor.

As reference values, an embodiment according to the disclosure with first and second cooling impellers achieves a reduction in the winding temperature of 50% compared to an embodiment with only the first cooling impeller and of 85% compared to an embodiment completely without first and second cooling impellers during operation at room temperature and under the same general conditions.

An advantageous compact embodiment of the electric motor provides that the second cooling impeller is integrally connected to the rotor. Such connection is achieved either by bonding or pressing the second cooling impeller with or onto the magnet of the rotor. Thus, the second cooling impeller is driven via the rotation of the rotor. An additional connection to the drive shaft is possible, but not necessary.

In a further development of the electric motor, supporting of the drive shaft is provided in the axial direction adjacent to the second cooling impeller and on the axial side opposite to the stator. Supporting the drive shaft is preferably only provided axially on one side opposite the stator. Thus, the first cooling impeller can be positioned on the drive shaft directly adjacent to the stator on the second axial side and generate a first flow of cooling air to the motor electronics, but also along an axial outer surface of the stator and rotor. Additional supporting on the axial side of the first cooling impeller can be omitted.

In an advantageous embodiment of the electric motor, supporting is provided by at least one drive shaft bearing integrated in an end shield. Preferably, however, at least two drive shaft bearings are used, both of which are integrally received in the end shield and spaced apart in the axial direction.

A further embodiment of the electric motor provides that the end shield has a receiving space receiving the second cooling impeller which rotates therein during operation and generates the second cooling air flow. Integration of the second cooling impeller into the end shield's receiving space results in an advantageous compact axial overall design of the electric motor. Furthermore, an embodiment is favorable in this respect, which the second cooling impeller has a hub section enclosing the at least one drive shaft bearing in the axial direction. This means that the drive shaft bearing can be disposed in an axial plane with the second cooling impeller and the required axial installation space is not increased.

An embodiment variant of the electric motor provides that a circumferential outlet gap is formed between the end shield and the stator, via which the second cooling air flow can be conveyed radially outwards and discharged into the environment during operation of the electric motor. The heat transferred from the stator to the cooling air flow can thus be transferred to the environment in a targeted manner and without any relevant flow losses.

A further development of the electric motor is characterized in that the receiving space of the end shield and the second cooling impeller have mutually corresponding shapes. This means that a wall of the receiving space facing the second cooling impeller extends substantially parallel to the second cooling impeller such that an axial gap between the end shield and the second cooling impeller is constant.

In an exemplary embodiment, the second cooling impeller has a radial edge section which is configured to be inclined in the axial direction towards the stator. Shaping of the second cooling impeller can thus be configured according to a shape of the stator in order to compensate for elements of the stator projecting in the axial direction via the shape of the second cooling impeller. A gap defined between the stator and the second cooling impeller or impeller blades of the second cooling impeller is therefore constant. In addition, the flow of the second cooling impeller can be directed via the shape of the receiving space and its wall, for example in the direction of the circumferential outlet gap between the stator and end shield.

In an advantageous embodiment with regard to the dimensioning of the second cooling impeller in relation to the stator, it has been found that the second cooling impeller advantageously has a diameter D2 which is configured in relation to an outer stator diameter DS of the stator such that $0.9\ D2 \leq DS \leq 1.1\ D2$. This means that the stator and the second cooling impeller have essentially the same outer diameter.

Furthermore, an embodiment is favorable in which the first cooling impeller has an outer diameter D1 which is configured in relation to an outer rotor diameter DR of the rotor such that $0.6\ D1 \leq DR 1.1\ D1$. Furthermore, the dimensioning of the cooling impellers is advantageous if the second cooling impeller has an outer diameter D2 which is configured in relation to an outer diameter D1 of the first cooling impeller such that $0.3\ D2\ D1 \leq 0.7\ D2$. If the first cooling impeller is configured with a correspondingly small outer diameter, sections thereof can be positioned radially within the stator, thus reducing the axial installation space required and favoring the compact design of the electric motor.

In an advantageous embodiment, the impeller blades of the second cooling impeller are curved backwards with respect to the direction of rotation of the electric motor and thus increase the cooling capacity of the second cooling impeller. Impeller blade numbers within a range of 15-25, in particular 17-23, further preferred 19-21 impeller blades have been found to be advantageous.

BRIEF DESCRIPTION OF THE DRAWINGS

Other advantageous further developments of the disclosure are characterized in the dependent claims or are described below in conjunction with the description of the preferred embodiment of the disclosure with reference to the figures. In the drawings:

Throughout the views, like reference numerals refer to like elements.

DETAILED DESCRIPTION

Figure 1:
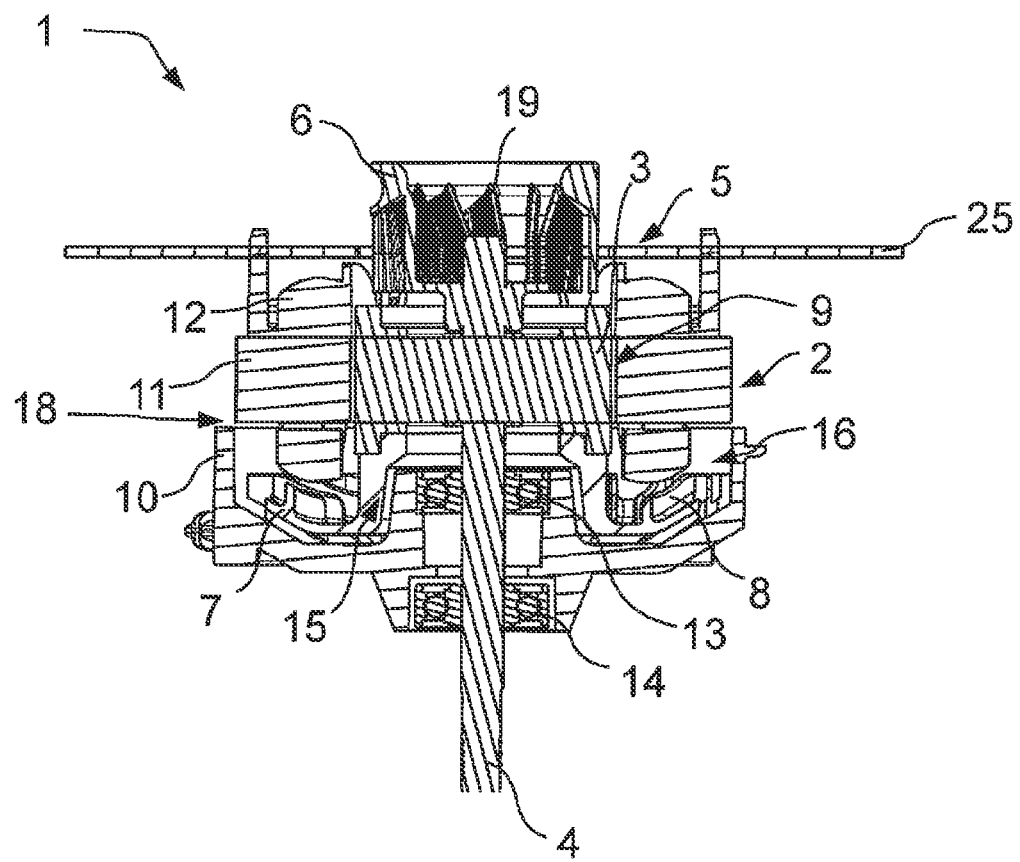
FIG. 1 shows a side sectional view of an exemplary embodiment of an electric motor.

FIG. 1 shows a side sectional view of an exemplary embodiment of an electric motor 1. Electric motor 1 is configured as an internal rotor motor with a rotor 3 disposed on drive shaft 4 extending in the axial direction and a stator 2 enclosing rotor 3. Stator 2 comprises laminated cores 11 and windings 12. On the first axial side of stator 2, the first cooling impeller 6 having blades 19 arranged in a blade rim is positioned on drive shaft 4. Printed circuit board 25 with motor electronics 5 disposed thereon extends in an axial plane with the first cooling impeller 6. The first cooling impeller 6 draws in a first flow of cooling air axially from above and blows it out radially over circuit board 25 and an axial surface of rotor 3 and stator 2. The outer diameter of the first cooling impeller 6 is smaller than the inner diameter of stator 2, such that sections of the first cooling impeller 6 are inserted axially in stator 2 and partially enclosed by rotor 3.

The second cooling impeller 7 is positioned on the second axial side opposite stator 2, directly adjacent to the windings 12 of stator 2 on the drive shaft 4, and connected to rotor 3. Axially adjoining, electric motor 1 has end shield 10 with two drive shaft bearings 13, 14 integrated therein and axially spaced apart, supporting drive shaft 4 at two points on one side. End shield 10 extends in the radial direction beyond stator 2 and forms a receiving space 16 in which the second cooling impeller 7 is completely received, rotates during operation of electric motor 1 and generates the second cooling air flow in the axial direction along the inner circumferential surface of stator 2 via its backwards curved impeller blades 8. The second cooling air flow is drawn in the axial direction along the cooling gap 9 provided between the rotor and laminated core 11 and windings 12 of stator 2 and blown out via the circumferential outlet gap 18 provided between stator 2 and end shield 10. The wall of receiving space 16 contributes to directing the cooling air flow to outlet gap 18.

Figure 2:
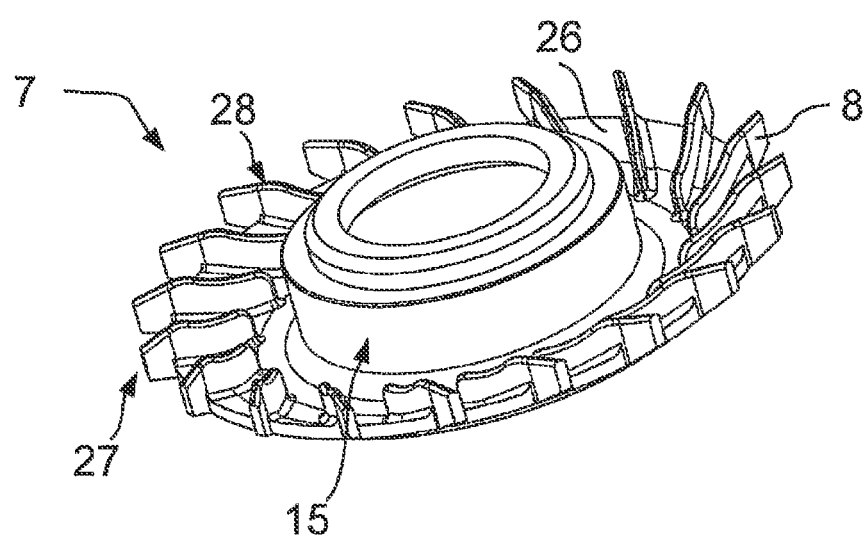
FIG. 2 shows a perspective view of an exemplary embodiment of the second cooling impeller of the electric motor from FIG. 1.

Further referring to FIG. 2, in which a perspective view of the second cooling impeller 7 is shown, second cooling impeller 7 comprises, in the region extending around drive shaft 4, hub portion 15, which is configured to be axially recessed and encloses the upper drive shaft bearing 13 in the axial direction such that the hub portion 15 and the drive shaft bearing 13 extend within an axial plane. Second cooling impeller 7 rectilinearly extends outwards in the radial direction into the middle section adjacent to hub section 15. The radial edge section is configured to be inclined in axial direction towards windings 12 of stator 2. The shape of receiving space 16 of end shield 10 corresponds to the shaping of the second cooling impeller 7 such that an axial gap between end shield 10 and the second cooling impeller 7 is constant over the outwards extension in the radial direction.

In the embodiment shown, the second cooling impeller 7 has an outer diameter which is essentially the same as that of stator 2, but twice as large as the outer diameter of the first cooling impeller 6.

The second cooling impeller 7, as shown in FIG. 2, is configured with a circular base 26. The nineteen backwards curved impeller blades 8 each have the same shape, wherein their free leading axial edges 28 have different pitches and are adapted to an outer contour of windings 12 of stator 2 such that the distance between windings 12 and the axial leading edges 28 is constant. The radial outer edges 27 of impeller blades 8 project radially outwards over a circumferential edge of circular base 26. Impeller blades 8 are spaced from hub section 15 radially on the inside.

The invention claimed is:

1. An electric motor configured as an internal rotor motor for driving a fan, comprising:
   a stator;
   a rotor;
   a drive shaft;

motor electronics disposed on a first axial side of the stator;

a first cooling impeller associated with the motor electronics and disposed on the first axial side of the stator on the drive shaft and which generates a first cooling air flow at least to the motor electronics during operation of the electric motor; and a second cooling impeller disposed immediately adjacent the stator on a second axial side of the stator opposite the first axial side and which has impeller blades generating a second cooling air flow at least in the axial direction along the stator during operation of the electric motor, wherein a support for the drive shaft is provided in the axial direction adjacent to the second cooling impeller, wherein the support comprises at least one drive shaft bearing integrated in an end shield, wherein the end shield has a receiving space receiving the second cooling impeller and is formed with a wall extending axially and terminating such that the wall of the end shield is formed with a circumferential edge along the terminated end of the wall, and a radial side of the stator has a terminal end, and wherein a circumferential outlet gap between the circumferential edge of the end shield and the terminal end of the stator is formed around the terminated end of the wall, via which the second cooling air flow can be conveyed radially outwards during operation of the electric motor wherein a radial outer edge of the impeller blade projects radially outward over a circumferential edge of a circular base formed in the second cooling impeller.

2. The electric motor according to claim 1, wherein the second cooling impeller is integrally connected to the rotor.

3. The electric motor according to claim 1, wherein a cooling gap is formed between the stator and the rotor through which the second cooling impeller, which is configured as a radial impeller, draws the second cooling air flow.

4. The electric motor according to claim 1, wherein the receiving space of the end shield and the second cooling impeller have mutually corresponding shapes such that an axial gap between the end shield and the second cooling impeller is constant.

5. The electric motor according to claim 1, wherein the second cooling impeller has a radial edge section which is configured to be inclined in the axial direction towards the stator.

6. The electric motor according to claim 1, wherein the second cooling impeller has a diameter D2 which is configured in relation to an outer stator diameter DS of the stator such that $0.9D2 \leq DS \leq 1.1D2$.

7. The electric motor according to claim 1, wherein the first cooling impeller has an outer diameter D1 which is configured in relation to an outer rotor diameter DR of the rotor such that $0.6D1 \leq DR \leq 1.1D1$.

8. The electric motor according to claim 1, wherein the second cooling impeller has an outer diameter D2 which is configured in relation to an outer diameter D1 of the first cooling impeller such that $0.3D2 \leq D1 \leq 0.7D2$.

9. The electric motor according to claim 1, wherein the impeller blades of the second cooling impeller are configured to be curved backwards.

10. The electric motor according to claim 1, wherein, in a cross-sectional view of the end shield, the end shield has a corner which is substantially right angle and another corner which is inclined-shape angle.

11. The electric motor according to claim 1, wherein supporting is only provided axially on one side opposite the stator.

12. The electric motor according to claim 11, wherein the second cooling impeller has a hub section enclosing the at least one drive shaft bearing in the axial direction.

* * * * *